United States Patent
More et al.

(10) Patent No.: US 12,197,782 B2
(45) Date of Patent: Jan. 14, 2025

(54) HINT-BASED FAST DATA OPERATIONS WITH REPLICATION IN OBJECT-BASED STORAGE

(71) Applicant: Seagate Technology LLC, Fremont, CA (US)

(72) Inventors: Shankar Tukaram More, Pune (IN); Vidyadhar Charudatt Pinglikar, Pune (IN)

(73) Assignee: Seagate Technology LLC, Fremont, CA (US)

( * ) Notice: Subject to any disclaimer, the term of this patent is extended or adjusted under 35 U.S.C. 154(b) by 330 days.

(21) Appl. No.: 17/675,533

(22) Filed: Feb. 18, 2022

(65) Prior Publication Data
US 2023/0266919 A1    Aug. 24, 2023

(51) Int. Cl.
*G06F 3/06* (2006.01)

(52) U.S. Cl.
CPC .......... *G06F 3/0659* (2013.01); *G06F 3/0622* (2013.01); *G06F 3/0676* (2013.01); *G06F 3/0679* (2013.01)

(58) Field of Classification Search
CPC ........ G06F 3/061; G06F 3/0622; G06F 3/065; G06F 3/0659; G06F 3/0665; G06F 3/067; G06F 3/0676; G06F 3/0679
USPC .......................................................... 711/154
See application file for complete search history.

(56) References Cited

U.S. PATENT DOCUMENTS

| | | | |
|---|---|---|---|
| 10,979,383 B1 | 4/2021 | Warfield et al. | |
| 11,310,309 B1* | 4/2022 | Coleman | H04L 67/1023 |
| 2005/0125625 A1* | 6/2005 | Kilian | G06F 3/067 711/202 |
| 2005/0144172 A1 | 6/2005 | Kilian et al. | |
| 2009/0259740 A1* | 10/2009 | Hepburn | H04L 41/0686 709/223 |
| 2013/0042060 A1* | 2/2013 | Marukame | G06F 16/137 711/108 |
| 2013/0275656 A1* | 10/2013 | Talagala | G06F 12/0246 711/103 |
| 2013/0326504 A1* | 12/2013 | Tsirkin | G06F 9/45558 718/1 |
| 2014/0101397 A1* | 4/2014 | Shribman | G06F 3/0617 711/E12.103 |
| 2014/0359612 A1 | 12/2014 | D Amato et al. | |
| 2014/0372725 A1* | 12/2014 | Almasi | G06F 12/023 711/173 |
| 2016/0203053 A1* | 7/2016 | Talagala | G06F 3/0653 714/6.12 |
| 2017/0083828 A1* | 3/2017 | Baranczyk | G06F 16/24544 |
| 2017/0091242 A1* | 3/2017 | Shukla | G06F 16/2246 |

(Continued)

*Primary Examiner* — Reginald G Bragdon
*Assistant Examiner* — Aaron D Ho
(74) *Attorney, Agent, or Firm* — Mueting Raasch Group

(57) ABSTRACT

A storage command is received from a client computer. The storage command includes a key associated with a content object that is to be written to two or more storage nodes in response to the command. A virtual address space is used to indicate a storage location of the content object. A virtual address of the virtual address space is assigned to the content object. The content object is redundantly stored the two or more storage nodes at respective two or more device addresses of the respective two or more storage nodes. The two or more device addresses are mapped to the virtual address, and the virtual address is returned to the client computer as a hint.

19 Claims, 7 Drawing Sheets

(56) References Cited

U.S. PATENT DOCUMENTS

| | | | |
|---|---|---|---|
| 2017/0300407 A1* | 10/2017 | Qiu ....................... | G06F 3/0653 |
| 2019/0042144 A1* | 2/2019 | Peterson ................ | G06F 3/0635 |
| 2019/0108119 A1* | 4/2019 | Gholamipour ........ | G06F 3/0616 |
| 2020/0136971 A1* | 4/2020 | Cohen .................... | H04L 9/0643 |
| 2020/0264992 A1* | 8/2020 | Raisch ................ | G06F 13/1668 |
| 2020/0310859 A1* | 10/2020 | Gupta ................... | G06F 3/0635 |
| 2020/0311015 A1* | 10/2020 | Xu ......................... | G06F 9/5022 |
| 2021/0326270 A1* | 10/2021 | Zou ........................ | G06F 3/0604 |
| 2022/0206952 A1* | 6/2022 | Yuan ...................... | G06F 3/067 |
| 2022/0319597 A1* | 10/2022 | Moyer ................. | G11C 15/046 |
| 2023/0055091 A1* | 2/2023 | Abramovitz ........ | H04L 67/1046 |
| 2023/0275958 A1* | 8/2023 | Nakatani ............ | H04L 67/1001 |
| | | | 709/223 |

\* cited by examiner

HINT-BASED FAST DATA OPERATIONS WITH REPLICATION IN OBJECT-BASED STORAGE

SUMMARY

The present disclosure is directed to hint-based fast data operations in object-based storage. In one embodiment, a storage command is received from a client computer. The storage command includes a key associated with a content object that is to be written to two or more storage nodes in response to the command. A virtual address space is used to indicate a storage location of the content object. A virtual address of the virtual address space is assigned to the content object. The content object is redundantly stored the two or more storage nodes at respective two or more device addresses of the respective two or more storage nodes. The two or more device addresses are mapped to the virtual address, and the virtual address is returned to the client computer as a hint.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
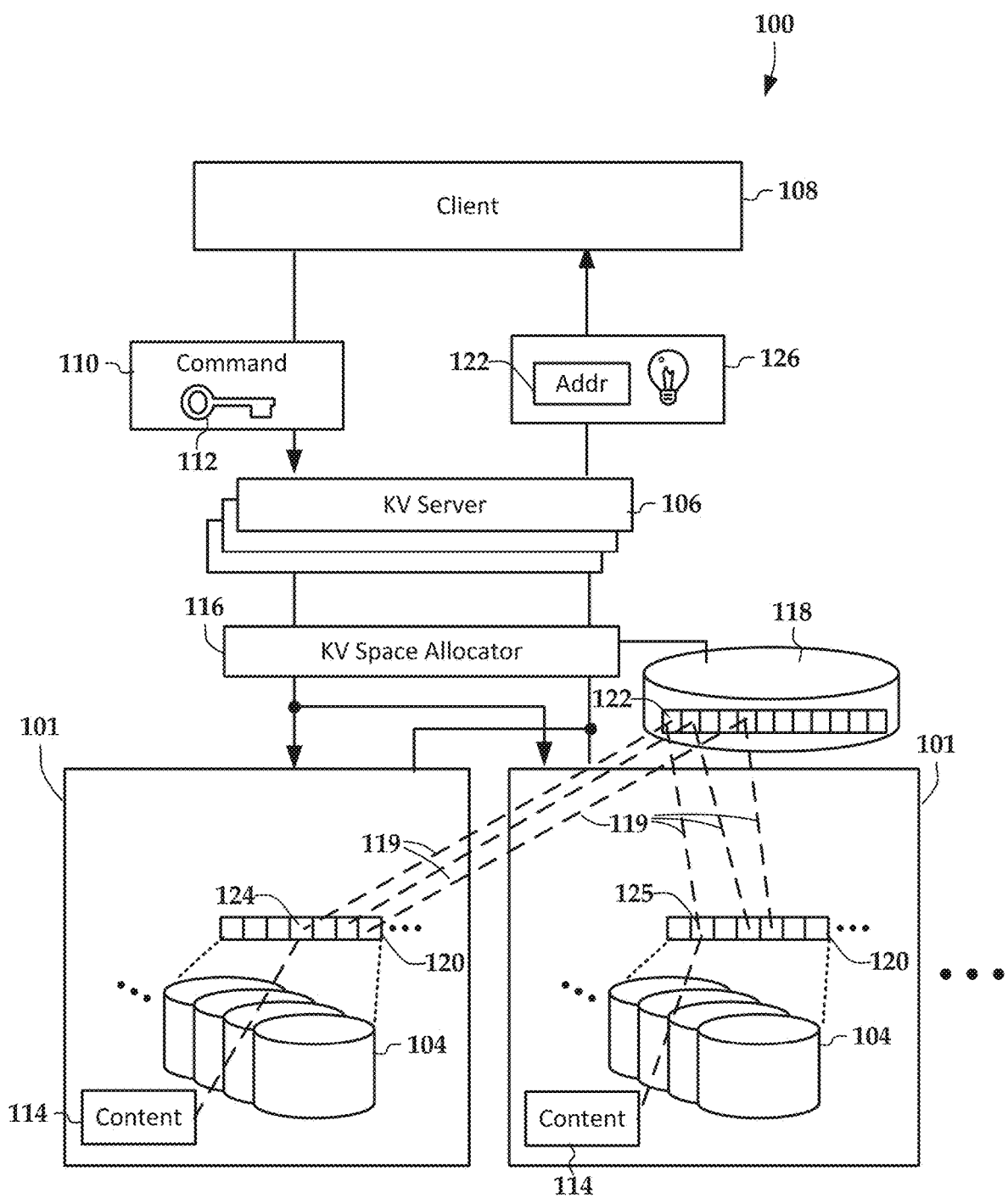
FIG. 1 is a diagram of showing an object storage system according to an example embodiment.

The present disclosure is generally related to object storage. Storage devices have traditionally used a combination of block-based storage and filesystems, in which data structures (e.g., metadata, files, directories) of the filesystems are mapped to locations (e.g., block addresses) on the device. A traditional filesystem typically uses a fixed metadata structure that stored on a data storage device (e.g., hard disk drive, solid state drive, RAID subsystems, optical storage) together with the associated data files. At least some of these data structures are located at predetermined addresses so that a host computer can easily find a root of the filesystem, which enables traversing the entire file system hierarchy. For directories, this metadata may include block addresses of various files and subdirectories stored on the directory. For individual files, this metadata may include a location of the start of the file and a size of the file. For both files and directories, the metadata may also include a name of the file/directory, timestamps of created, edited, etc., flags for read/write permissions, etc.

In a traditional filesystem, the drive itself has no knowledge of whether a particular block address is being used to store data, metadata, etc. All of the metadata is maintained by the host, e.g., the computer that is attached to the drive. The drive treats all data equally, although may perform some data analysis such as tracking read and write activity for the purposes of caching so that more commonly used data can be accessed in a faster tier of local storage.

Traditional filesystems and block storage are effective for many uses. For example, the hierarchy of a filesystem is easily represented in a user interface as collections of folders and files. In such a case, when a user selects of a file to edit it, it is straightforward to map the filesystem path of the selected file to a starting block address of the file, and then load at least part of the file into random access memory for the use of an editor program. In other cases, traditional filesystems are not so efficient. For example, in files that are accessed in a large-scale storage system (e.g., clustered storage), namespace collisions of individual files may occur amongst the many different filesystems that are accessible on the storage system.

In order to address these issues of traditional filesystems, the concept of object storage has been introduced. Object storage removes some of the lower-level details of storage (e.g., mapping of data to block addresses) from the end-users of the data, e.g., operating systems, applications, systems administrators. Instead of data being mapped as files to local filesystem structures, the data is treated as objects with a unique identifier, referred to herein as a key. This key is used for access operations such as read, write, modify, append, etc., and is also associated with the object metadata. Because object storage drives (or storage subsystems) have an understanding of particular objects, the drives can make decisions about how to store the data to optimize aspects such as access times, search and indexing, reliability, recoverability, etc. All of this can be made invisible to the end users, who only need to know the keys that are associated with an object for retrieval, storage, and modification.

An object-based storage system may be able to provide other functionality not provided by conventional storage systems. For example, such a system may be able to accept queries about the object data. The system can review and process queries on object metadata, and in response return keys of objects that satisfy the query. This provides flexibility for the end user, in that content-related searches can be made to find classes of objects, as well as being able to access individual objects using the key.

An object storage system generally uses a key-value paradigm, where a globally unique key is mapped to a single object, which corresponds to the value associated with the key. Key-value data normally gets stored in a fast lookup data map structure such as a binary tree (b-tree) or a B+ tree. A B+ tree is tree structure with often large numbers of children per node, and is well-suited for filesystem applications.

While a B+ tree can perform fast lookups, the key-value lookup operations can still be a performance choke point for very large storage systems. Modification and reading of the B+ tree involves locking the structure to prevent corrupting data. These locks can cause contention for the storage resources. For example, it may take multiple disc accesses to fetch a value for a given key. As the number of key-value records increases, the performance of system decreases. Therefore, a system according to an example embodiment may use a different way of accessing object stores that lessens the impact of key-value lookups.

In FIG. 1, a diagram shows a simplified view of a system 100 according to an example embodiment. The system includes two or more storage nodes 101 each having an array 104 of storage drives. A key-value (KV) server 106 is operable to receive, from a client computer 108, a storage command 110 comprising a key 112. The key 112 is associated with a content object 114 that is written to at least one of the two or more storage nodes 101.

A key-value space allocator 116 provides a virtual address space 118 used to indicate a storage location of the content object 114. The virtual address space 118 is mapped 119 to respective local address spaces 120 of the two or more storage nodes 101. The local address spaces 120 include device addresses used to directly access a storage device, and may include a range of block addresses of a partition, drive and/or array. The key-value server 106 is further operable to assign a virtual address 122 of the virtual address space 118 to the content object 114. The content object 114 is redundantly stored in the two or more storage nodes at respective two or more device addresses 124, 125 of the respective local address spaces. The two or more device addresses 124, 125 are mapped to the virtual address 122. The key-value server 106 returns the virtual address 122 to the client computer as a hint 126. The hint 126 is used for subsequent access to the content object 114 from any of the two or more storage nodes 101 without using the key 112 for locating the content object 114.

As shown, there may be one or more additional key-value servers 106. In such a case, multiple mappings 119 may be made between each virtual address space of the key-value servers 106 to the respective local address spaces. This allows the same virtual address 122 of the hint 126 be usable by any combination of the one or more additional key-value servers 106 and storage nodes 101. The mapping 119 of the virtual address space 118 to the respective local address spaces 120 may be done statically at initialization of the system, although addresses may also be dynamically allocated or reallocated at run time, e.g., when additional storage space is needed from the two or more storage nodes 101.

Even though the client computer 108 receives the hint 126, the client computer 108 may still use the key 112 for an advanced lookup. The hint 126 is not necessarily used for the advanced lookup, even though the hint 126 may reference an object that is the subject of the advanced lookup. For example, the advanced lookup may include a search on object metadata, and the search may return multiple content objects, including the object 114 that is identified by the hint 126.

Figure 2:
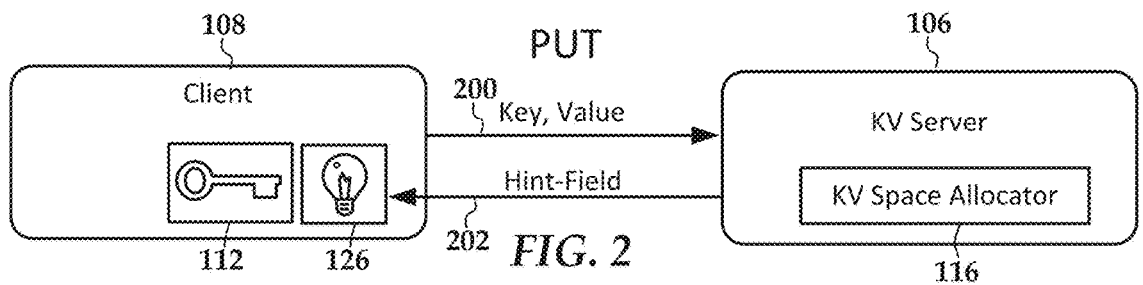
FIGS. 2 and 3 are diagrams of PUT and GET operations in a storage system according to an example embodiment.
Figure 3:
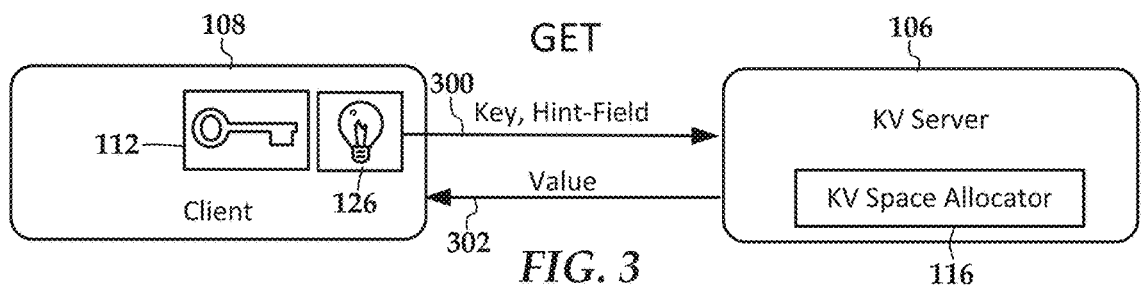

In FIG. 2, a diagram shows details of a PUT operation according to an example embodiment. The key-value application (shown here as client 108) sends a PUT command 200 to the key-value server 106. The PUT command 200 includes the key 112 and a value (e.g., data that defines the content object). In response to the PUT command 200, the key-value server 106 stores the content object data in a storage node (not shown) where it is assigned a virtual address by the key-value space allocator 116. The value of virtual address is used to form the hint 126, which is returned to the client 108 in an acknowledgement response 202. The client 108 pre-allocates space for the hint 126 before sending the PUT command 200, and saves the hint 126 for further operations, such as a GET operation as shown in FIG. 3. Note that the key-value server 106 may also use the key 112 to enable access to the content object in the usual way (e.g., lookup in a B+ tree), as well as for advanced lookups/searches.

Note that the hint 126 may include other data in addition to the virtual address where the content object is stored. For example, the hint 126 may include data such as a which KV-Server was used for storing key-value, modification timestamp, object size, hash of the content data, etc., that indicates whether or not the data accessed at the virtual address has changed since it was stored. For example, if the content object was modified by another client which changed the object's size, then the virtual address or other hint data may not be usable alone to retrieve the content object data. The virtual address may be reused where the data size has changed and the new data size is also known, e.g., by the client making the change, and the starting address has not changed.

In FIG. 3, a diagram shows details of a GET operation according to an example embodiment. The key-value application (shown here as client 108) sends a GET command 300 to the key-value server 106. The GET command 300 includes both the key 112 and the hint 126. Assuming the hint 126 is still usable, then the key-value server 106 returns the value 302 using a direct access at the logical address, which is mapped to a physical address on at least one storage array. If the hint 126 is not usable (e.g., object was changed or moved), then the key 112 may still be used to retrieve the value 302 in the conventional way.

Figure 5:
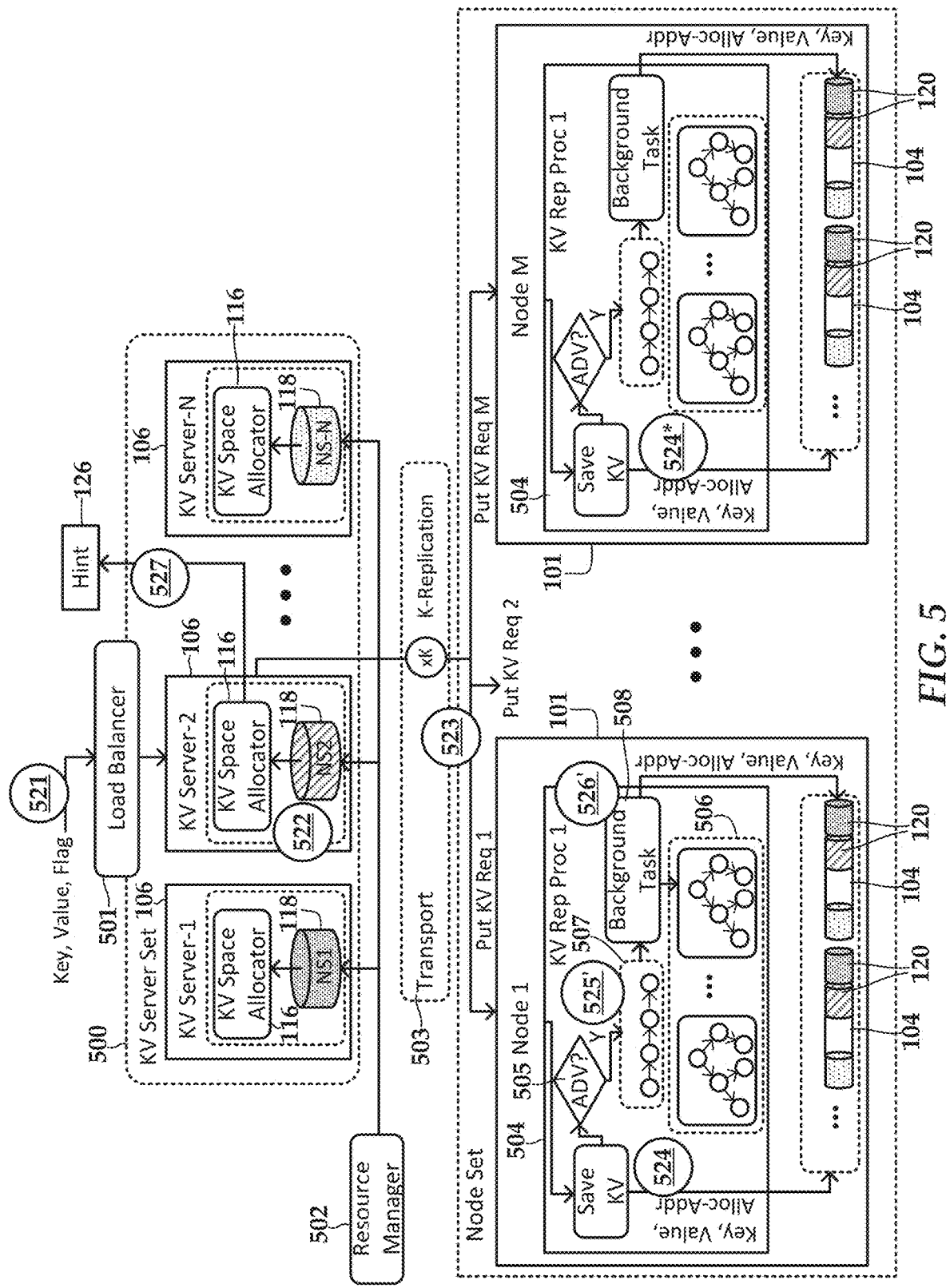
FIGS. 5 and 6 are diagrams detailing steps of PUT and GET operations in a storage system according to an example embodiment.

In FIG. 5, a diagram shows a system according to a more detailed embodiment. The system includes multiple key-value servers 106 that are part of a key-value server set 500. A load balancer 501 distributes requests among the key-value servers 106, any of which can service a request. The selection of key-value server can also be based on key hash, so request will go to the same key-value server for PUT, GET and DELETE operations and this can help to reduce the need for distributed locking. Each key-value server 106 has an associated space allocator 116 and virtual address space 118.

Figure 4A:
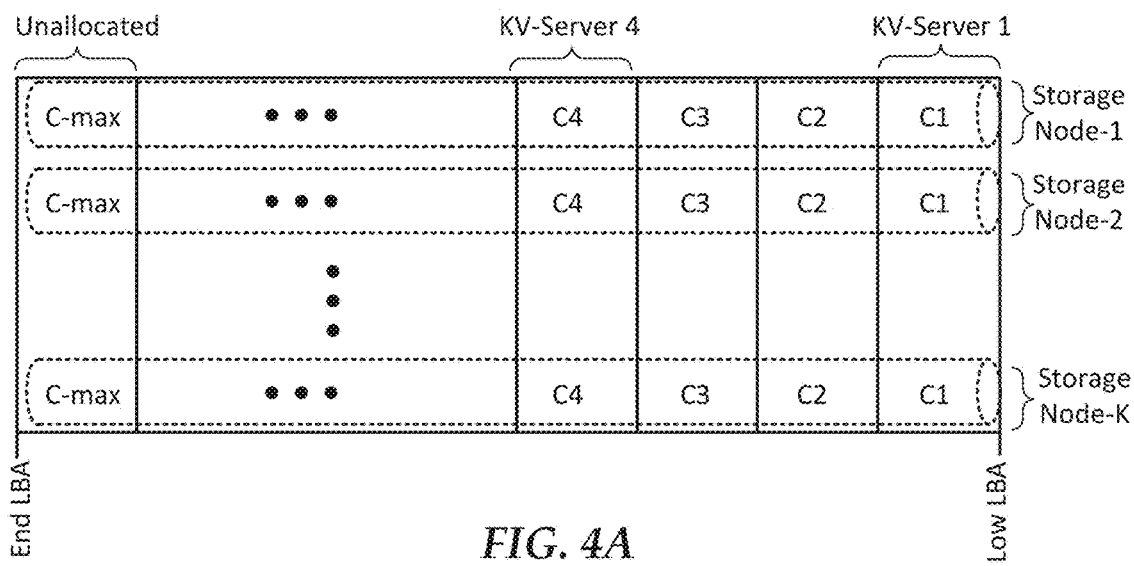
FIGS. 4A and 4B are diagrams showing mapping between virtual addresses and device addresses in a storage system according to an example embodiment.

Note that each of the virtual address spaces 118 is illustrated with a different hatching, which corresponds to hatching of one of the local device address spaces 120 in each of the plurality of storage nodes 101. Further, each storage node 101 may have K-different redundant storage arrays 104. Thus, each storage node 101 may have N*K different mappings between the logical addresses of the key-value servers 106 and the local arrays 104. This is shown in the diagram of FIG. 4A, where each row indicates a different device (e.g., partition, disk, array) of a storage node. This table can be maintained by a resource manager 502 (described below), which communicates with and has information pertaining to all of the key-value servers 106.

Figure 4B:
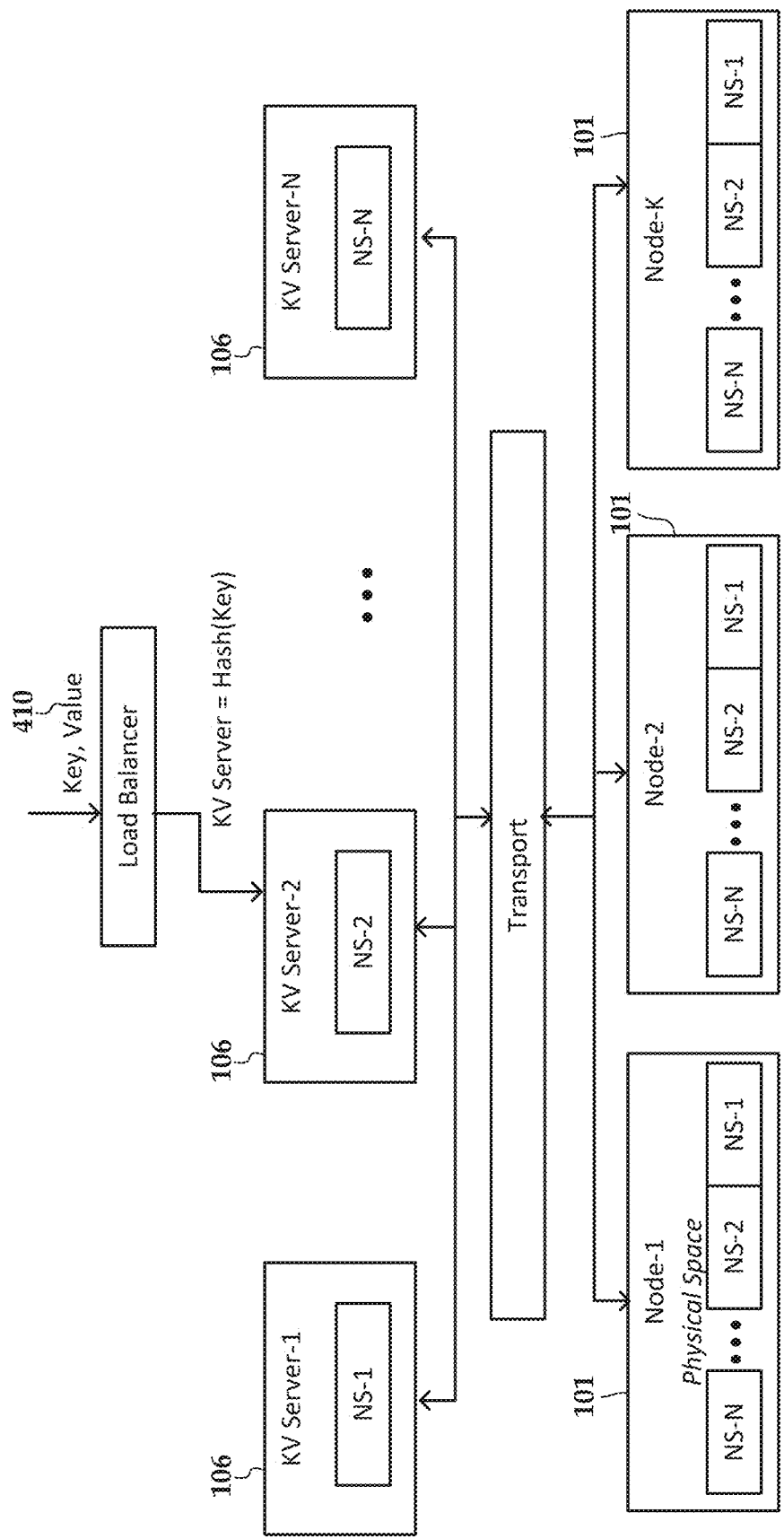

The allocation scheme shown in FIG. 4A is a symmetric node configuration, details of which are shown in the diagram of FIG. 4B. In one such configuration, each key-value server 106 can be allocated fixed storage-space at each of the storage nodes 101. The key-value 410 is saved with replication at same location in all the storage nodes 101. For example, if the key value 410 is stored at address A in virtual address space NS-2, then it will be replicated at each block labeled NS-2 in the figure. The hint is the address A where replicated key-value is stored in each storage node 101. Data will get symmetrically stored across nodes 101. This symmetric duplication will help to simplify and speed rebuilding of lost data in case of node replacement, because each storage node 101 is a mirror copy of the others. Data for rebuild can be parallelly fetched from online nodes 101 and reconstrued at new node.

In reference again to FIG. 5, circular blocks show individual steps that may be performed in the processing of a PUT operation, e.g., as shown in FIG. 2. The operations begin with a PUT request 521 that includes a KV pair associated with a content object that is to be stored. The request 521 originates from a client application (not shown)

and will arrive at a selected one of the key-value servers 106 (KB Server-2 in this example) via the load balancer 501 (e.g., the server being selected based on the value of a hash of the key) to ensure uniform distribution of load. The key-value space allocator 116 interacts with a resource manager 502 to allocate a chunk of space, e.g., at system initialization and/or when space is needed. Note that the extent of space allocated, will be reserved at each storage node 101 for specific key-value server 106 as shown in FIGS. 4A and 4B and described above. The chunk of storage space allocated can be any part of an array, drive, or drive partition.

Once the resource manager 502 allocates this space, key-value space allocator 116 will manage allocation of this space for individual key-value operations. Dynamic allocation will have some set of chunks reserved across all of the storage devices (arrays 104) and will be allocated by resource manager 502 when a key-value space allocator 116 requests an allocation, as indicated by block 522. The key-value space allocator 116 can also use a key hash to select a chunk to localize related key storage. This will be helpful in advanced search.

After allocation of space, the key-value space allocator 116 will send details 523, 524 to the storage nodes 101 to effect storage of the key-value data. Note that based on the system configuration, M-nodes can be selected for replication of the data. A transport layer 503 will forward the request to a set of the selected nodes and these requests will be processed in parallel, as indicated by blocks 524 and 524*, which are parallel requests.

Each of the storage nodes 101 has a key-value request processor 504 to handle the requests 524, 524*. The key-value request processor 504 will save the key-value request at specified space. Block 505 indicates a test as to whether advanced search features are requested or subscribed for the content object (e.g., based on the value of the flag in the request 521). If no advance search feature is requested or subscribed, then after servicing the requests 524, 524* an acknowledgement will be returned to key-value server 106. If the client application has requested/subscribed for advance search feature for key-value, then optional operations 525', 526' will be performed, As indicated by optional operation 525', the key and hint will be added to a linked list 507 of a linked list for further processing. A success response will then be sent to the key-value server 106. A background task 508 will hash the key value and store 526' the key and hint to one of a number of B+ trees 506 based on the hash. Storing the key-value pair in the B+ trees 506 will be used to service advance searches, e.g., for related keys. Once key-value request processor 504 has responded, the key-value server 106 will return success 527 to the client application along with the hint.

Figure 6:
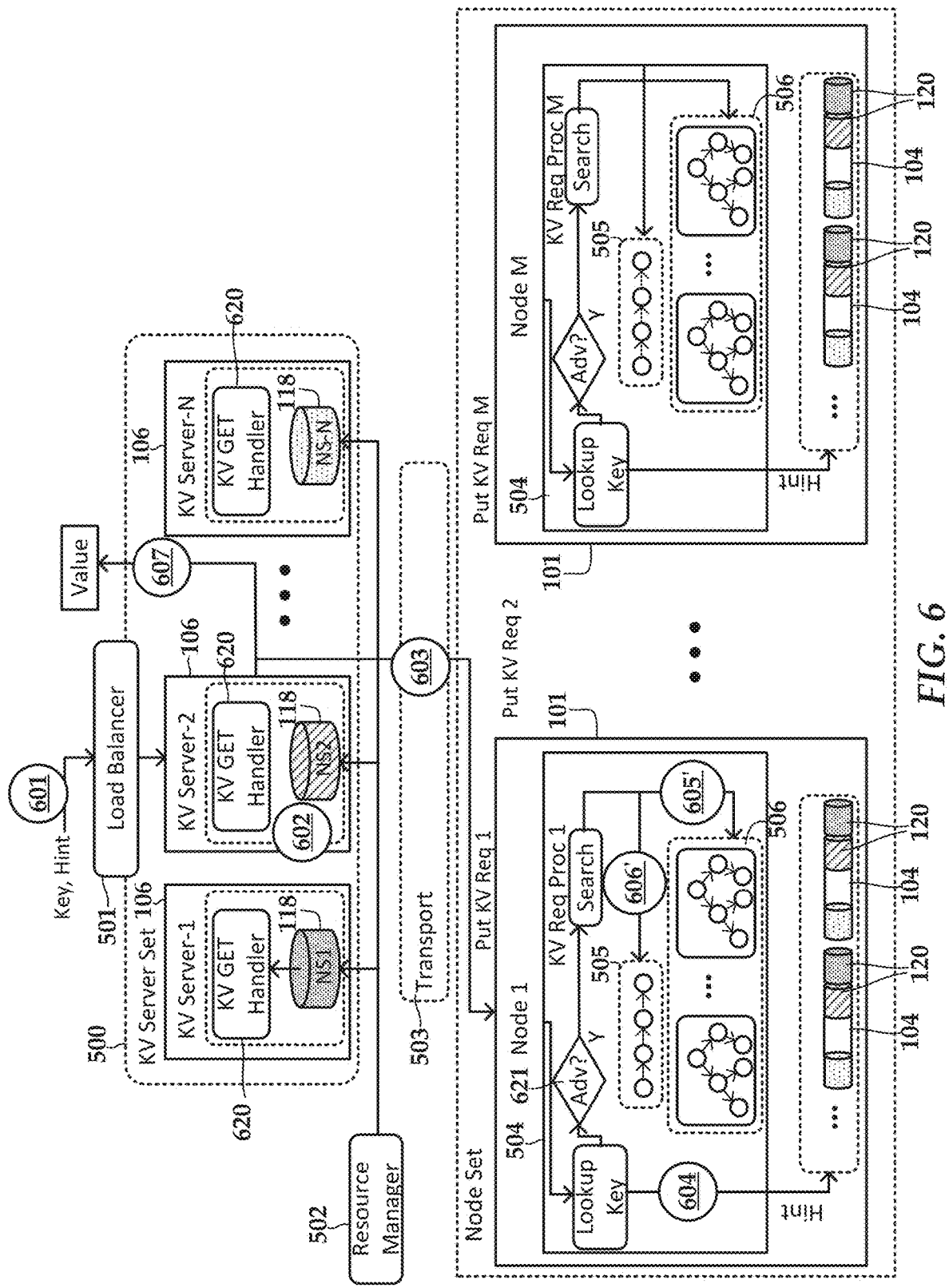

In FIG. 6, a diagram shows the system in FIG. 5 processing a GET request according to an example embodiment. Circular blocks in FIG. 6 show individual steps that may be performed in the processing of a GET operation, e.g., as shown in FIG. 3. The operations begin with a GET request 601 that includes a key and hint pair associated with a content object that is to be retrieved from storage. The request 601 originates from a client application (not shown) and will arrive at a selected one of the key-value servers 106 (KV Server-2 in this example) via the load balancer 501 (e.g., key hash based) to ensure uniform distribution of load.

A key-value GET handler 620 will send 602, 603 the key and hint to one of the selected storage nodes 101 where the key value is stored to service the request. The request is sent via transport layer 503, which can distribute the requests between the multiple storage nodes 101 for load-leveling purposes. The key-value request processor 504 will use the hint to directly address the storage device 104 and fetch 604 the value, which can be returned 607 to the client application. Note that using the hint to directly access the data may involve using the logical address (which is generic to all of the storage nodes 101) contained in the hint to lookup a device-specific address, which is specific to just the storage node 101 selected for the retrieval. In case of an advanced lookup (block 621 returns 'yes'), the key can optionally be searched 605', 606' in the B+ trees 506 and linked-list 507.

The embodiments described above can reduce disk access times for KV PUT and GET operations. This reduces the burdens on KV operation locking requirements, which can cause contention when searching through data structures such as B+ trees. Further, the B+ trees normally contain both key and value, and values are normally variable sized and/or unbounded. Even when the number of stored key-values increase, impact can be minimized if clients use hints for a majority of GET operations, the supports better scalability. Note that the advanced search within the B+ tree can return with key-hint (not key-value), where it may be assumed that the hint is a fixed size address. A key-based query in such a case may return a set of hints, and these hints may be used by the node or the requestor to retrieve the content. In a system where key sizes are fixed or bounded in size, then the B+ tree nodes become fixed in size. Fixed size B+ tree nodes simplify operations, reduce storage needs and can help to speed lookup with a caching mechanism. Related keys can be localized with hash-based chunk selection by the allocator. The resource manager along with KV space allocator will help to support PUT operation with replication, across a multiple-device name space.

Figure 7:
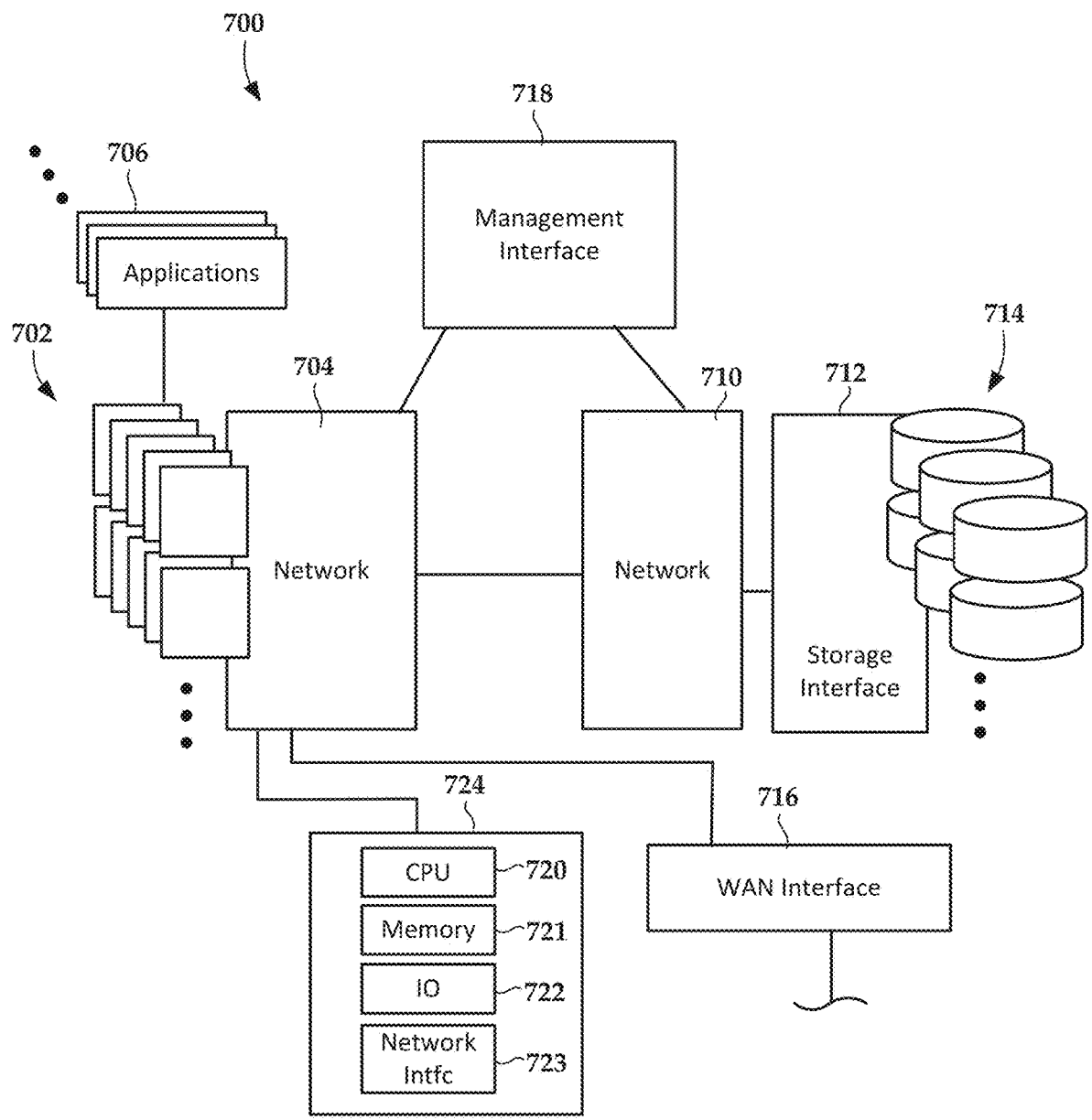
FIG. 7 is a block diagram of a system and apparatus according to an example embodiment.

In FIG. 7, a diagram illustrates hardware details of a system 700 according to an example embodiment. Any of the embodiments shown in FIGS. 1-6 can be implemented using a hardware arrangement as shown in FIG. 7. The system 700 is implemented using one or more computing nodes 702, which each generally includes computing hardware such as central processing units (CPUs), random access memory (RAM), graphics processing units (GPU), input-output (IO) hardware, etc. The computing nodes 702 are generally coupled to one or more network segments 704 that allow the compute nodes 702 to communicate with one another and with the rest of the software system 700.

The computing nodes 702 may include individual servers, or each may include a virtual machine, where multiple virtual machines run on a single host server. The computing nodes 702 may each include independently-operating software, e.g., kernels, operating systems, drivers, etc. Generally, the arrangement and configuration of the nodes 702 may be different depending on the high-level functions provided by the system 700, here represented as applications 706. For example, the system 700 may be configured as a general-purposes web service provider, offering such services as Web hosting, email hosting, e-commerce, relational database, etc. In other embodiments, the system 700 may provide a single service such as cloud storage, cloud compute, machine learning compute, paralleled supercomputing, etc.

The applications 706 are also referred to herein as user applications, in that an end-user relies on the applications 706 to perform specified tasks. While some user applications will involve user direct user interactions (e.g., web server, e-commerce) not all user applications will require direct user interface. Note that the term user application is not meant to imply only a single user process. For example, a user application may include cluster computing application, in which many thousands of individual processes work across the data center on a single task.

Generally, the applications 706 will use some level of persistent data storage. According to various embodiments, a network 710 is dedicated to storage, e.g., a storage area network (SAN). The storage network 710 is coupled to local storage interfaces 712 (e.g., controller cards) that ultimately send data in and out of storage media 714, e.g., hard disks, solid-state drives (SSDs), optical storage, tape storage, etc.

Also shown in FIG. 7, is a wide-area network (WAN) interface 716 that is accessible by the system 700. The WAN interface 716 may be coupled to the public Internet, and/or via non-public WANs. A management interface 718 is shown coupled to various components within the system 700. The management interface 718 may include software that runs dedicated hardware (e.g., management computers) as well as being distributed to other computing nodes and devices throughout the system 700. The management interface 718 may provide, among other things, interfaces that allow a person or a supervisor program manage aspects such as load balancing, thermal management, failure detection and remediation, etc.

The hardware used by the system 700 can vary widely, but generally includes conventional computing components as illustrated by example computing device 724. The device 724 includes a processor 720 (e.g., central processing unit, or CPU) that runs software instructions, and may also include embedded firmware. A memory 721 is coupled to the CPU 720 and may include any combination of volatile memory (e.g., random access memory, or RAM) and non-volatile memory (e.g., flash memory, magnetic storage). The CPU 720 communicates with the memory 721 and other peripherals via IO circuitry 722, which may include memory busses, peripheral busses, etc. An example of a peripheral device is shown as network interface 723, which facilitates communicating via the networks 704. Note that the system 700 need not be tied to a particular location and can use similarly configured hardware and software processes that are remotely located and accessible via WAN interface 716.

Figure 8:
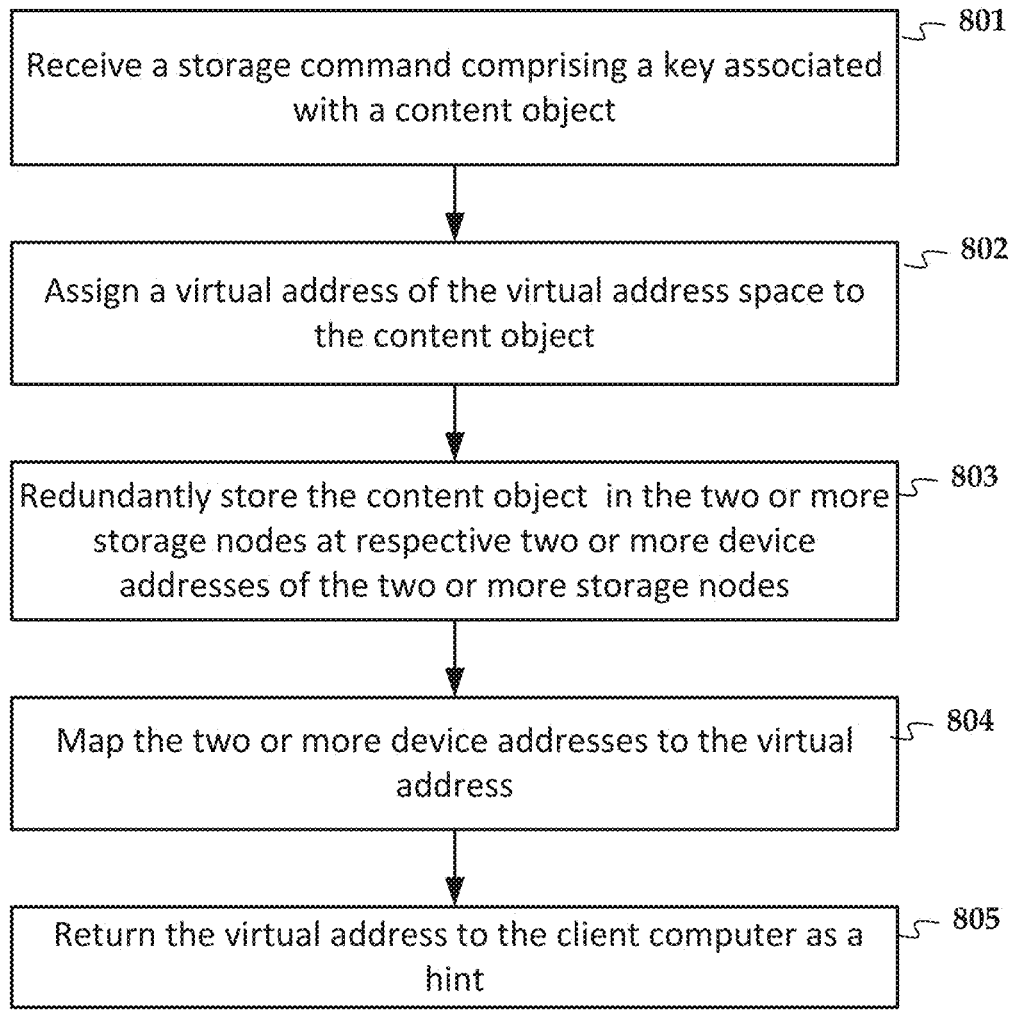
FIG. 8 is a flowchart of a method according to an example embodiment.

In FIG. 8, a flowchart illustrates a method according to an example embodiment. The method involves receiving 801, from a client computer, a storage command comprising a key. The key is associated with a content object that is to be written to two or more storage nodes in response to the command. A virtual address of the virtual address space is assigned 802 to the content object. The content object is redundantly stored 803 in the two or more storage nodes at respective two or more device addresses of the two or more storage nodes. The two or more device addresses are mapped 804 to the virtual address and the virtual address is returned 805 to the client computer as a hint. The hint can be used by the client computer for subsequent access to the content object via any of the two or more storage nodes without using the key for locating the content object.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An object storage system, comprising:
   two or more storage nodes each having an array of storage drives;
      a key-value space allocator that provides a virtual address space used to indicate a storage location of content object data, the virtual address space being mapped to respective local address spaces of the two or more storage nodes; and
   a key-value server operable to:
      receive, from a client computer, a storage command comprising a key associated with a content object that is written to at least one of the two or more storage nodes, wherein the object storage system hides block addresses of data from the client computer via the key-value server;
      use a map and the key to determine a virtual address of the content object or to assign the virtual address to the content object, the virtual address belonging to the virtual address space, the content object being redundantly stored in the two or more storage nodes at respective two or more device addresses of the respective local address spaces, the two or more devices addresses being mapped to the virtual address; and
      in response to the storage command, return to the client computer a hint comprising the virtual address;
      receive a subsequent access request from the client computer directed to the content object, the subsequent access request different from the storage command and including the hint and the key; and
      in response to the subsequent access request, use the virtual address to access the content object without using the key to look up the virtual address in the map.

2. The system of claim 1, wherein the key-value server is one of a plurality of key-value servers of the system, wherein the mapping of the virtual address space to the respective local address spaces is usable by all of the plurality of key-value servers to service access requests using the hint.

3. The system of claim 2, further comprising a load balancer that selects one of the plurality of key-value servers to process the storage command based on a hash of the key.

4. The system of claim 3, wherein each of the plurality of key value servers has a dedicated virtual address space, and wherein the dedicated virtual address spaces are symmetrically reserved across all of the two or more storage nodes.

5. The system of claim 4, wherein data stored at the dedicated virtual address spaces are mirrored across all of the two or more storage nodes.

6. The system of claim 1, wherein the mapping of the virtual address space to the respective local address spaces is done statically at initialization of the system.

7. The system of claim 1, wherein the mapping of the virtual address space to the respective local address spaces is done dynamically when additional storage space is needed from the two or more storage nodes.

8. The system of claim 1, wherein the client computer uses the key for an advanced lookup, the hint not being used for the advanced lookup.

9. The system of claim 8, wherein the advanced lookup comprises a search in a B+ tree at one of the two or more storage nodes based on the key.

10. The system of claim 9, wherein the B+ tree stores the hints and keys, and wherein the hints are fixed or bounded in size, the advanced lookup returning a set of hints based on the key.

11. The system of claim 1, wherein the client computer stores the hint and the key for the subsequent access to the content object.

12. The system of claim 1, wherein the hint further includes an indicator usable to determine whether or not the data accessed at the virtual address has changed since it was stored, and wherein the indicator is used by the key-value server to determine whether to use the virtual address without using the key to look up the virtual address in the map.

13. A method comprising:
receiving, from a client computer, a storage command comprising a key, the key associated with a content object that is to be written to two or more storage nodes of an object storage system in response to the command, wherein the object storage system-uses the key to hide block addresses of data from the client computer;
determining a virtual address space used to indicate a storage location of the content object;
assigning a virtual address of the virtual address space to the content object in a map using the key or determining the virtual address of the content object from the map using the key;
redundantly storing the content object in the two or more storage nodes at respective two or more device addresses of the respective two or more storage nodes;
map the two or more device addresses to the virtual address;
return the virtual address to the client computer as a hint;
receiving a subsequent access request from the client computer directed to the content object, the subsequent access request different from the storage command and including the hint and the key; and
in response to the subsequent access request, using the virtual address to access the content object without using the key to look up the virtual address in the map.

14. The method of claim 13, further comprising, at initialization, statically mapping the virtual address space to two or more local address spaces of the respective two or more storage nodes, the two or more device addresses being selected from the two or more local address spaces.

15. The method of claim 13, further comprising dynamically mapping the virtual address space to two or more local address spaces of the respective two or more storage nodes when additional storage space is needed from the two or more storage nodes.

16. The method of claim 13, further comprising:
receiving a request from the client computer to retrieve the content object with the hint;
selecting one of the two or more storage nodes to service the request; and
use the hint to determine a selected one of the two device addresses are associated with the selected storage node; and
using the selected device address to directly fetch the content object.

17. The method of claim 13, further comprising:
receiving, from the client computer, a query comprising the key;
performing a search in a B+ tree at one of the two or more storage nodes based on the key; and
returning a set of hints based on the key.

18. An object storage system, comprising:
a plurality of key-value servers that each have a respective virtual address space used to indicate a storage location of a content object, wherein the object storage system uses keys to hide block addresses of data from a client computer;
a plurality of storage nodes, the respective virtual address spaces of the plurality of key-value servers being mapped to respective local address spaces of the plurality of storage nodes;
a load balancer operable to receive, from the client computer, a storage command comprising a key associated with the content object, the load balancer selecting one of the plurality of key-value servers to process the storage command based on the key; and
the selected key-value server operable to:
in response to the storage command, assign, in a map using the key, a virtual address of the selected key-value server's respective virtual address space to the content object or determine the virtual address of the content object from the map using the key, the content object being redundantly stored in the plurality of storage nodes at a respective plurality of device addresses of the respective local address spaces, the plurality of device addresses being mapped to the virtual address;
return the virtual address to the client computer as a hint;
receive a subsequent access request from the client computer different from the storage command, the subsequent access request directed to the content object, the subsequent access request including the hint and the key; and
in response to the subsequent access request, use the virtual address to access the content object without using the key to look up the virtual address in the map.

19. The system of claim 18, and wherein the respective virtual address spaces are symmetrically reserved across all of the plurality of storage nodes.

* * * * *